United States Patent Office 3,069,962
Patented Dec. 25, 1962

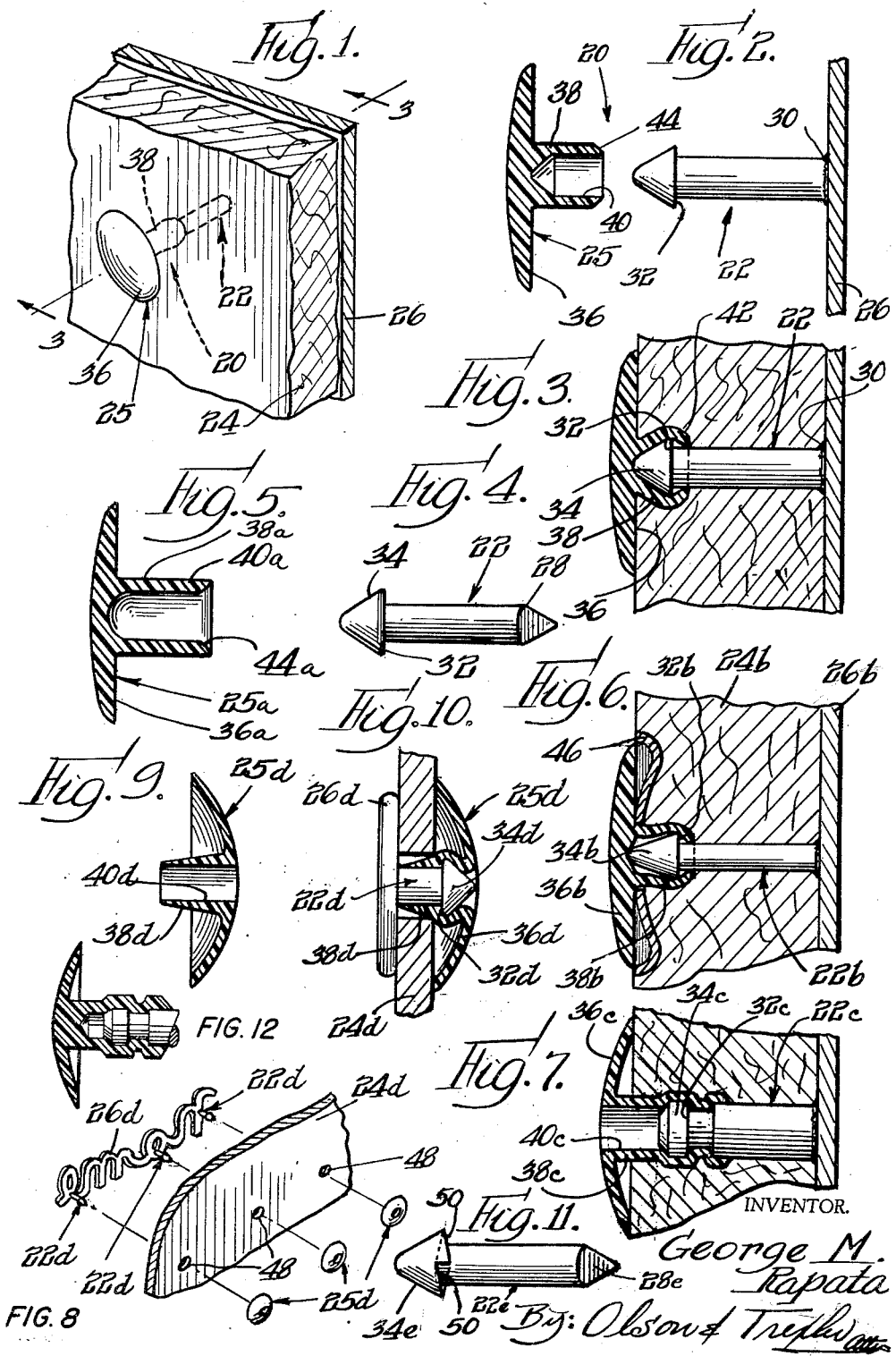

3,069,962
FASTENER MEANS COMPRISING RESILIENT SOCKET MEANS CONTRACTIBLE ABOUT SHOULDER MEANS ON A STUD MEMBER
George M. Rapata, Chicago, Ill., assignor to Illinois Tool Works, Inc., a corporation of Delaware
Filed Feb. 8, 1957, Ser. No. 638,942
4 Claims. (Cl. 85—8.8)

The present invention relates to a novel fastening device, and more particularly to a novel device including a head or anchor member and a stud for securing a plurality of workpieces together.

An important object of the present invention is to provide a novel fastening device including a stud and a plastic member for receiving the stud, which stud and plastic member are of simple and economical construction and may be easily assembled and also disassembled and then reassembled if desired.

A more specific object of the present invention is to provide a fastening device of the above described type wherein the plastic member is formed from a material which may be expanded or stretched and which inherently tends to return to its initial shape, and wherein the plastic member and stud are formed so as to utilize the tendency of the plastic material to return to its original shape for securing the parts together.

A further more specific object of the present invention is to provide a novel fastening device of the above described type wherein the plastic member and stud are formed so that they may be easily assembled by relatively axially shifting them into telescoping relationship and without turning one of the parts relative to the other.

Other objects and advantages of the present invention will become apparent from the following description and the accompanying drawings wherein:

FIG. 1 is a fragmentary perspective view showing a work structure including a fastening device embodying one form of the present invention;

FIG. 2 is an exploded partial sectional view showing the fastening device of FIG. 1;

FIG. 3 is a partial vertical sectional view taken along line 3—3 in FIG. 1;

FIG. 4 is a side view of the stud member of the embodiments shown in FIGS. 1-3 prior to welding an end of the stud member to a workpiece or panel;

FIG. 5 is a sectional view showing a plastic fastening member incorporating a slightly modified form of the present invention;

FIG. 6 is a partial cross sectional view similar to FIG. 3 and further shows the use of a washer in the work assembly;

FIG. 7 is a partial sectional view similar to FIG. 3 and showing another modified form of the present invention;

FIG. 8 is an exploded perspective view showing another embodiment of the present invention wherein one or more studs are secured to an article such as a name plate to be mounted on an apertured panel or workpiece;

FIG. 9 is a sectional view showing a plastic fastening member embodying another modified form of the present invention, which fastening member is of the type shown in FIG. 8;

FIG. 10 is a partial sectional view showing the structure of FIG. 8 fully assembled;

FIG. 11 shows a modified stud member; and

FIG. 12 shows another modified form of the present invention.

Referring now more specifically to the drawings wherein like parts are designated by the same numerals throughout the various figures, one embodiment of the present invention is shown in FIGS. 1-4. The fastening device 20 of this embodiment comprises a stud member 22 and a fastening member 25 which is preferably molded and is formed from any suitable plastic or cold flowable material such as nylon or aluminum which is capable of being deformed and has the characteristic, after being deformed, of tending to return to its initial or molded shape. While various uses for the fastening device 20 will suggest themselves, the device is particularly suitable for securing a sheet 24 of insulating material to a panel 26.

As shown in FIG. 4, the stud member 22 is provided with an initially pinched or pointed end 28, which pointed end facilitates welding of the stud to the panel 26 as indicated at 30 in FIGS. 2 and 3. Adjacent its opposite end, the stud 22 is provided with laterally or radially projecting shoulder means 32. In this embodiment, the shoulder means is provided by an enlarged end portion 34 of the stud member, which end portion is preferably tapered so as to facilitate entry thereof into the plastic member 25 in the manner described below.

The plastic member 25 is provided with a relatively large head having a radially extending work engageable surface 36 of considerable area so that the head is particularly adapted for retaining the relatively soft insulating panel 24 which may be formed of fiber glass or the like. A sleeve portion 38 extends axially from the head portion 36 and is provided with a central bore 40 which has a diameter less than the outside diameter or maximum transverse dimension of the shoulder means 32 on the stud.

When assembling the work structure shown in FIGS. 1-3, the stud member 22 is first welded to the panel 26 and then the insulating material is pressed over the stud and against the panel 26. Then the plastic fastening member is easily assembled by simply forcing its sleeve into the insulating material and telescopically over the enlarged end portion 34 of the stud. As the sleeve passes over the enlarged end portion of the stud, it is caused to expand radially to permit entry of the stud end portion. It is important to note that after the shoulder means 32 of the stud has entered the sleeve bore, the free end portion 42 of the sleeve contracts towards its original diameter around the stud and behind the shoulder means 32 as shown in FIG. 3 so as to restrain inadvertent removal of the plastic fastening member. It will be noted that, in this embodiment, the diameter of the bore portion into which the enlarged end of the stud is inserted is uniform throughout so as to simplify the construction of the plastic member. It is also to be noted that the plastic member may be manually removed from the stud, when desired, whereupon the sleeve portion will return substantially to its original shape so that the plastic member may be resued. As shown best in FIG. 2, the outer surface of the free end of the sleeve portion 38 is beveled as indicated at 44 so as to facilitate passage of the sleeve portion through the insulating material and also to increase the resiliency of the end of the sleeve so as to promote easier starting of the sleeve onto the enlarged end of the stud.

FIG. 5 shows a plastic fastening member embodying a slightly modified form of the present invention, which fastening member is similar to the one described above as indicated by the application of identical reference numerals with the suffix *a* added to corresponding elements. This embodiment differs in that the inner surface of the free end of the sleeve is beveled as indicated at 44*a* so as to provide the bore 40*a* with an enlarged mouth for further promoting easy application of the fastening member to the stud.

FIG. 6 shows another embodiment of the present invention wherein the stud and plastic fastening members are similar to those described above as indicated by the application of identical reference numerals with the suffix *b* added to corresponding elements. In this embodiment a spring washer 46 is positioned on the sleeve adjacent the clamping face of the head portion 36*b* for resiliently clamping the workpiece or insulating panel 24*b* against the panel 26*b*.

FIG. 7 shows another embodiment of the present invention wherein elements similar to those described above are designated by identical reference numerals with the suffix *c* added. In this embodiment, the plastic fastening member differs in that the bore 40*c* extends through the head portion so that in the event the stud member is too long for a particular work structure, the plastic fastening device may be forced onto the stud member sufficiently to compensate for the extra length of the stud member without the limitation imposed by closing the end of the bore as is done in the above described embodiments. Also in this embodiment the head portion 36*c* is dished and made resilient so that it functions resiliently to clamp the various parts of the work structure together. It is to be understood, that, if desired, the bores in the plastic fastening members described above may be extended through the head portions thereof or such head portions may be formed similarly to the head portion 36*c* for resiliently clamping the work structure as is illustrated by the device 25*f* shown in FIG. 12.

The stud member 22*c* differs in that its diameter throughout its length is substantially greater than the normal diameter of the bore 40*c*, and the shoulder means 32*c* is provided by forming an annular groove in the stud 22*c*. With this arrangement interconnection between the plastic member and the stud member is obtained by a portion of the sleeve which contracts into the annular groove in the stud in the manner shown. It is to be understood that the stud member 22*c* may also be used in combination with the other plastic fastening members disclosed herein.

FIGS. 8, 9 and 10 show another embodiment of the present invention wherein elements similar to those described above are identified by identical reference numerals with the suffix *d* added. This embodiment illustrates the manner in which one or more of the fastening devices may be utilized for securing an article such, for example, as a name plate 26*d* to an apertured workpiece 24*d*. In the embodiment shown, three of the stud members 22*d* are secured to and extend from the name plate 26*d* and are adapted to extend through apertures 48 in the workpiece or panel 24*d* for connection with the fastening devices 25*d*. As shown best in FIGS. 9 and 10, the plastic fastening member 25*d* of this embodiment has a dished resilient head portion 36*d* which is formed so that a major portion of the sleeve 38*d* is located within the hollow of the dished head portion. In addition, the outer surface of the sleeve 38*d* is tapered towards its free end so that the resiliency thereof progressively increases towards its free end for facilitating application to the stud member. It will be appreciated that, if desired, the sleeve portions of the plastic fastening members described above may also be tapered in the same manner.

FIG. 11 shows a modified stud member 22*e* which can be used with any of the plastic devices disclosed herein. This stud member differs in that the plastic fastening member engageable shoulder means thereof is provided by a pair of helical cam surfaces 50 which are oppositely disposed about the circumference of the end portion 34*e* and are of limited circumferential extent. After a plastic device has been axially applied to the stud member 22*e*, it may be further tightened by turning it so that the cam surfaces pull it onto the stud.

While the preferred embodiments of the present invention have been described and shown herein, it is obvious that many structural details may be changed without departing from the spirit and scope of the appended claims.

The invention is claimed as follows:

1. A fastening device comprising a stud member including laterally extending shoulder means providing an annular substantially radially extending surface, said surface having a predetermined maximum transverse dimension and said stud member having a smaller transverse dimension behind said surface, said stud member including a solid free entering end relatively sharply intersecting said surface and tapering forwardly from said shoulder means, and a one piece resilient plastic fastening member including a laterally extending substantially solid head portion having one side engageable with a work structure, and an axially extending self-supporting and resiliently expandable thin-walled sleeve portion integral with and extending from said one side of said head portion and adapted to be inserted into the work structure and to be applied over said entering end and said shoulder means of said stud member, said sleeve portion having a substantially smooth inner surface and an unrestricted open mouth, said sleeve portion further having an internal transverse dimension less than said predetermined transverse dimension and substantially uniform throughout its length and greater than transverse dimensions of said tapering entering end of the stud at its outermost terminal, said sleeve portion having a transverse wall thickness which progressively decreases adjacent its terminal end for relatively increasing the resiliency thereof to promote easier application of the sleeve portion to the stud member and which does not substantially decrease in a direction from said terminal end toward said head portion, said sleeve member being telescopically applicable to the stud member sufficiently to position a part thereof past said shoulder means, said sleeve portion being expanded throughout its wall thickness so that its inner and outer surfaces are both contoured to provide a shoulder means accommodating bulge upon application to the stud member, and inner and outer surfaces of said sleeve portion part contracting behind said shoulder means surface after such application so as to restrain removal of the fastening member from the stud member.

2. A fastening device, as defined in claim 1, wherein said stud member includes an enlarged end portion which provides said shoulder means.

3. A fastening device, as defined in claim 1, wherein said stud member has groove means in a peripheral surface thereof, said shoulder means being provided by a wall of said groove means.

4. A fastening device, as defined in claim 1, wherein, said head portion is resilient and is dished shaped, said head portion being disposed with a concave side thereof facing a free end of said sleeve portion and being resiliently engageable with a work structure for cooperating with the stud member resiliently to clamp the work structure.

References Cited in the file of this patent

UNITED STATES PATENTS

| | | |
|---|---|---|
| 809,792 | Eustis | Jan. 9, 1906 |
| 1,005,356 | Swift | Oct. 10, 1911 |
| 1,780,555 | Johnson | Nov. 4, 1930 |
| 2,069,849 | Rich | Feb. 9, 1937 |
| 2,118,561 | Kleeberg | May 24, 1938 |
| 2,292,752 | Gee | Aug. 11, 1942 |
| 2,367,657 | Boersma | Jan. 23, 1945 |
| 2,538,396 | Sutin | Jan. 16, 1951 |
| 2,785,453 | Wentz | Mar. 19, 1957 |